(12) United States Patent
Mayer Goyenechea Caballero

(10) Patent No.: US 10,301,454 B2
(45) Date of Patent: May 28, 2019

(54) WATER-BASED ELASTOMERIC COMPOSITION FOR IMPREGNATING TEXTILE MATERIAL AND USES THEREOF

(71) Applicant: Juan Antonio Mayer Goyenechea Caballero, Estado de Mexico (MX)

(72) Inventor: Juan Antonio Mayer Goyenechea Caballero, Estado de Mexico (MX)

(*) Notice: Subject to any disclaimer, the term of this patent is extended or adjusted under 35 U.S.C. 154(b) by 0 days.

(21) Appl. No.: 14/845,047

(22) Filed: Sep. 3, 2015

(65) Prior Publication Data

US 2015/0376374 A1 Dec. 31, 2015

Related U.S. Application Data

(63) Continuation-in-part of application No. 13/313,770, filed on Dec. 7, 2011, now abandoned.

(Continued)

(51) Int. Cl.
*C08K 5/3495* (2006.01)
*C08K 3/22* (2006.01)
(Continued)

(52) U.S. Cl.
CPC .......... *C08K 5/3495* (2013.01); *B05D 3/0272* (2013.01); *C03C 25/1095* (2013.01);
(Continued)

(58) Field of Classification Search
CPC .. C08K 5/3495; C08K 5/0058; C08K 5/0008; C08K 3/0008; C08K 3/22; C08K 3/346; C08K 2003/2241; C03C 25/1095; C03C 25/101; C03C 25/102; C03C 25/1015; D06M 16/00; D06M 15/227; D06M 15/223; D06M 15/17; D06M 11/46; D06M 2200/30; C09D 109/08; C09D 107/02; F16J 15/102; F16J 15/108; B05D 3/0272; B29K 2105/0064; Y10T 442/20; Y10T 442/2992; B29B 15/122

(Continued)

(56) References Cited

U.S. PATENT DOCUMENTS 3,425,954 A * 2/1969 Ruzevick ............... C23F 11/02
252/390
3,886,114 A * 5/1975 Beadle ................... C08K 5/005
252/400.24

(Continued)

FOREIGN PATENT DOCUMENTS

WO    WO 2007 140008 A2    12/2007

OTHER PUBLICATIONS

Aoki, I., Copper phthalocyanine as corrosion inhibitor for ASTM A606-4 steel in 16% hydrochloric acid, Journal of Applied Electrochemistry 32: 915-919, 2002.*

(Continued)

*Primary Examiner* — Jeremy R Pierce
(74) *Attorney, Agent, or Firm* — Dickinson Wright PLLC

(57) ABSTRACT

This invention provides a water-based elastomeric composition free from aromatics or similar solvents comprising: an elastomer, a thickener, titanium dioxide, an antioxidant, a fungicide, water and optionally a coloring agent. The composition further comprises a corrosion inhibitor and may be impregnated to a textile material, preferably a fiber glass textile.

17 Claims, 2 Drawing Sheets

Related U.S. Application Data

(60) Provisional application No. 61/420,873, filed on Dec. 8, 2010.

(51) Int. Cl.

| | | |
|---|---|---|
| C08K 5/00 | (2006.01) | |
| C08K 3/34 | (2006.01) | |
| D06M 15/227 | (2006.01) | |
| D06M 15/233 | (2006.01) | |
| D06M 11/46 | (2006.01) | |
| D06M 15/17 | (2006.01) | |
| B05D 3/02 | (2006.01) | |
| F16J 15/10 | (2006.01) | |
| C09D 109/08 | (2006.01) | |
| D06M 16/00 | (2006.01) | |
| C03C 25/1095 | (2018.01) | |
| C08K 5/098 | (2006.01) | |
| C08K 5/13 | (2006.01) | |
| C03C 25/47 | (2018.01) | |
| C03C 25/27 | (2018.01) | |
| C03C 25/475 | (2018.01) | |
| B29K 105/00 | (2006.01) | |
| B29B 15/12 | (2006.01) | |

(52) U.S. Cl.
CPC .............. *C03C 25/27* (2018.01); *C03C 25/47* (2018.01); *C03C 25/475* (2018.01); *C08K 3/22* (2013.01); *C08K 3/34* (2013.01); *C08K 3/346* (2013.01); *C08K 5/0008* (2013.01); *C08K 5/098* (2013.01); *C08K 5/13* (2013.01); *C09D 109/08* (2013.01); *D06M 11/46* (2013.01); *D06M 15/17* (2013.01); *D06M 15/227* (2013.01); *D06M 15/233* (2013.01); *D06M 16/00* (2013.01); *F16J 15/102* (2013.01); *F16J 15/108* (2013.01); *B29B 15/122* (2013.01); *B29K 2105/0064* (2013.01); *C08K 2003/2241* (2013.01); *Y10T 442/20* (2015.04); *Y10T 442/2992* (2015.04)

(58) Field of Classification Search
USPC .......... 442/59, 123–125, 136–147, 180, 181, 442/228, 229, 301; 427/385.5–393.6
See application file for complete search history.

(56) References Cited

U.S. PATENT DOCUMENTS

| 5,082,297 | A | * | 1/1992 | Flasher .................. F16J 15/022 277/608 |
|---|---|---|---|---|
| 6,242,524 | B1 | | 6/2001 | Schulz |
| 6,818,694 | B2 | | 11/2004 | Hindi et al. |
| 6,884,741 | B2 | | 4/2005 | Batdorf |
| 2005/0112374 | A1 | | 5/2005 | Jafee et al. |
| 2010/0018778 | A1 | * | 1/2010 | Nanayakkara .......... C08L 21/00 175/371 |
| 2010/0298275 | A1 | * | 11/2010 | Yin ........................ A01N 35/02 514/129 |
| 2012/0146297 | A1 | * | 6/2012 | Mayer Goyenechea Caballero .... B29B 15/122 277/650 |

OTHER PUBLICATIONS

Stroud, E. G. The prevention of corrosion in packaging. II. Temporary protecttves from rubber latex and other aqueous dispersions. J. Appl. Chem., 2: 173-177. 1952 doi:10.1002/jctb.5010020402.*

Gorman, S. P., Scott, E. M. and Russell, A. D. (1980), Antimicrobial Activity, Uses and Mechanism of Action of Glutaraldehyde. Journal of Applied Bacteriology, 48: 161-190. doi:10.1111/j.1365-2672.1980.tb01217.x.*

Dow, AQUCAR™ THPS 75 Water Treatment Microbiocide, http://web.archive.org/web/20120719020925/http://msdssearch.dow.com/PublishedLiteratureDOWCOM/dh_07e4/0901b803807e48b3.pdf?filepath=productsafety/pdfs/noreg/233-00676.pdf&fromPage=GetDoc, archived Jul. 19, 2012.*

Senkowski, E., Coatings for Elevated Temperature Service in Process Facilities, Journal of Protective Coatings & Linings, 2007, pp. 44-54.

Whelan, Polymer Technology Dictionary, 1994, p. 266.

\* cited by examiner

WATER-BASED ELASTOMERIC COMPOSITION FOR IMPREGNATING TEXTILE MATERIAL AND USES THEREOF

This application is a continuation-in-part patent application of U.S. patent application Ser. No. 13/313,770, filed Dec. 7, 2011, which is based on U.S. Provisional Patent Application Ser. No. 61/420,873, filed Dec. 8, 2010, the entire contents of which are hereby incorporated by reference.

FIELD OF INVENTION

The present invention refers to a water-based elastomeric composition to be applied on textile materials, for example rubberized fiber glass textile, which is used to create among others, joints and insulating seals for high temperature applications, in ovens, autoclaves, dryers, boilers, etc., where the joints are used for unions, flushed flanges, boiler turtles, joints with hand entrance and male entrance, insulation in piping systems, tanks, pressure vessels, deposits, autoclaves, mixers or dryers or any other equipment subjected to high temperatures, as well as high pressures, insulating or sealing against vapor, gas, oils and any other type of fluids. Specifically, the present invention also refers to a textile material impregnated with a water base solution.

DESCRIPTION OF RELATED ART

Previous art generally divulges fiber glass products impregnated with a mixture of different types of rubbers. These mixtures are made with some "essential compounding materials" that may include: Sulfur, Zinc Oxide, Accelerators, Antioxidants, Pigments, Fillers, etc. These materials are intended to increase the rubber's physical strength, improve aging and impart other desirable properties to the finished product. However, these and some other materials used are almost completely insoluble in water. Therefore, mixing them with the rubber will require that these materials must be prepared first in the form of stable dispersion for powders. For such task, organic solvents must be used. Some of the most common organic solvents used are aromatic, toluene and xylene, which are the most used, benzol (benzene & toluene), acetone, chloroform, alcohols and some others are also used. The aromatic solvents used in previous art are dangerous to those in direct contact with the solvent at the time of applying the refinish, since the high volatility of these solvents makes their vapor easily penetrable through the respiratory airways and quickly reaching the circulatory system of the person in contact. The solubles are further, generally lipo-soluble, which allows them to easily cross the blood brain barrier and reach the central nervous system.

Once inhaled, the vapors emitted by these types of substances, are quickly absorbed through the lungs and later reach the brain. Part of the effects is due to the reduction in the amount of oxygen which enters the organism during its aspiration. The inhalation of solvents causes the general organic functions such as respiration and heart rhythm to become depressed or slow down. Repeated use of deep inhalations can cause a type of "overdose" resulting in disorientation, loss of control and unconsciousness. After the inhalation and in the hours that follow, dizziness and drowsiness can occur, in addition to headaches and inability to concentrate.

Prolonged contact with the solvents (for example 5 or more years) can result in great damage to brain function, particularly affecting control of movement and the cognitive and learning abilities.

In similar manner, the solvents can act as volatile organic compounds (VOC), harmful to the environment since they are organic chemical compounds which mainly affect the air. VOCs include gasoline, industrial compounds such as benzene, and solvents such as toluene, xylene and percloethylene (the most used solvent for dry cleaning). All organic compounds contain carbon and constitute the basic component of living matter and all derivatives of the same. Many of the organic components we use are not found in nature, but rather, are obtained synthetically. The volatile chemical compounds easily emit vapors. The emanation of vapors from liquid compounds is quickly produced at room temperature. The VOCs emanate from the combustion of gasoline, wood, carbon and natural gas, and from solvents, paints, colas and other products commonly used in homes or in industry. The emanations of vehicles also constitute an important source of VOCs. Many volatile organic compounds are dangerous contaminants to the airways. For example, benzene has carcinogenic effects.

BRIEF SUMMARY OF THE INVENTION

The present invention provides fiber glass impregnated for joints and insulating seals, where the solvent base is eliminated, such as the aromatics, ketones, alcohols, aliphatics, gas solvents, chlorates, glycoethers and mixtures (Thinner Standard) for the impregnation. Specifically, the present invention employs, in order to impregnate the fiber glass, a water-base elastomeric composition and as a benefit has managed to diversify the gamut of colors on the textile including for example a light blue by means of the addition of pantones. In the same manner, other colors can be opted for by following established standards by the applicant, standards established by the consumer, or pre-established norms, without devaluing the product's operational conditions. Additionally, the present invention improved the performance of the fiber glass impregnation, due to having attained a longer lasting adhesiveness to the textile.

Thus, the present invention refers to a textile material which is impregnated with a water-base elastomeric composition which does not contain an aromatic solvent or any other type. The preferred textile material is a fiber glass textile.

The fiber glass textile is a fibrous material obtained upon making the molten glass flow through a piece with very fine holes, such as a spinneret, and upon solidifying it has sufficient flexibility to be used as a fiber. Within its main properties, fiber glass has good thermal insulation, inert to acids and capable of withstanding high temperatures, but it has poor sealing features. The impregnated textile material resists temperatures up to about 400° C. and pressures up to about 40 bar.

In another object, the invention provides a water-based elastomeric composition comprising an elastomer, a thickener, titanium dioxide, an antioxidant, a fungicide, water and optionally a coloring agent, wherein the elastomeric composition does not contain aromatics or similar solvents such as, for instance, ketones, alcohols, aromatics, aliphatics, gas solvents, chlorates, glycoethers and mixtures such as Thinner Standard.

In a preferred embodiment, the water-based elastomeric composition further comprises a corrosion inhibitor.

In another embodiment, the instant invention is directed to a textile material impregnated with the water-based elastomeric composition of the invention.

In a preferred embodiment, the corrosion inhibitor is selected, for instance, from sodium benzoate or a water based composition comprising sodium benzoate such as, for example, the composition sold under the trademark Zerust Axxanol 8110.

In an embodiment, the thickener is kaolin.

In another preferred embodiment, the textile material can be selected, for instance, from fiber glass textile or fiber glass textile with metallic wire inserts, such as, for example, brass wire inserts, stainless steel wire inserts, or a mixture thereof; or wire inserts from a different alloy.

Advantageously, the textile material impregnated with a water-based elastomeric composition comprising a corrosion inhibitor is an ecological product, free of solvents dangerous to human health and environment. The absence of aromatics or other type of related solvents permits to eliminate hazardous by-products produced by aromatic products.

In an additional embodiment, the textile material impregnated with the water-based elastomeric composition may be used to fabricate joints, gaskets and insulating seals for high temperature and/or pressure applications to be used, for instance, in ovens, autoclaves, dryers, boilers, etc., where the joints are used for unions, flushed flanges, boiler turtles, joints with hand entrance and male entrance, insulation in piping systems, tanks, pressure vessels, deposits, reactors, autoclaves, mixers or dryers or any other equipment subject to high temperatures, as well as high pressures, insulating or sealing against vapor, gas, oils and any other type of fluids.

Also, the water based elastomeric composition of the invention can be applied in both non-wire inserted textile and all kinds of wire inserted textiles. A wire textile used for insulating and gasketing purposes is the fiber glass with brass insert. This fiber has ample acceptance in the industry since brass has more and better ductile properties than any other metals and a "shape memory" that allows a strip of the material maintaining its position while folding during the gasket manufacture. The composition of this invention uses rubber materials that are preserved with ammonia (less than 0.6%). Brass and ammonia exhibit chemical incompatibilities, but it has been found by applicant that incorporation of a corrosion inhibitor into the water-based elastomeric composition permits that both brass and natural latex components comprised into the water based composition can coexist without any undesired chemical reaction.

On the joints of the present invention, the use of fiber glass is preferred, especially in light of the high temperature systems, such as boilers, tanks and tubing, among others. The body of the joints is made by doubling and adhering strips of the impregnated cloth, recovered or treated, in such a way that there is an adequate coupling on the contact surface, at the joint or flange and properly accomplishes the necessary seal.

Another property of the water-based elastomeric composition of the invention is that provides a fluid sealing to material textiles for, for instance, vapor, oils, gas, etc., granting a seal-ability which allows equipments using the impregnated textile materials such as, for instance, ovens, boilers, autoclaves, tanks, pressure vessels, deposits, autoclaves, mixers or dryers or any other equipment subjected to high temperatures, to safely operate within the norms of emissions towards the atmosphere. That is, the basic function of the impregnated textile is that it be insulating, avoiding the flow of temperature through the textile, sealing fluids, whether liquid or gas, as well as vapors, oils, solvents etc. under a determined pressure and temperature.

This substantial improvement in the mixture of the invention for the impregnation is what makes the textile material of the present application be different than the rest of the available products in the market to date.

Another objective of the present invention is to provide an identification system of the textile by means of the pigmentation of the material in different colors for easier and more efficient manipulation, both at the intake, as well as at the disposal of the material, in the equipment where the product shall be used, the simplest identification of the product, having the ability to be both at storage as well as in the work zone of the product, or in equipment with a defined use. A co-related objective of the present invention is to achieve a product with defined color to identify the pieces in the market.

It is yet another objective of the present invention to achieve a cost effective product competitively priced to compete with solvent base materials.

Yet another objective of the present invention is to provide a textile material impregnated with the water-based elastomeric composition resistant to temperature and pressure for joints, gaskets and seals, which can displace hazardous materials in the joints and seals, such as are asbestos or materials impregnated with solvents which are used in the market, providing the operators both durability and safety.

It is yet another objective of the present invention to provide a joint, gaskets or seal impregnated with the water-based elastomeric composition of the present invention. Furthermore, another correlated objective with the previous one is to provide a fiberglass joint or seal impregnated with the water-based elastomeric composition of the present invention.

Another advantage of the present invention is that textile material impregnated with an elastomeric mixture is capable of resisting temperatures up to about 400° C. and pressures up to about 40 bar pressure.

DETAILED DESCRIPTION OF THE INVENTION

Figure 1:
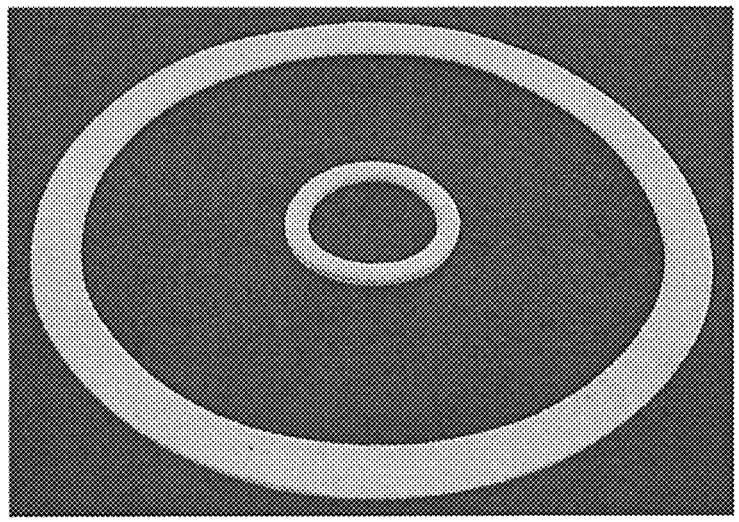
FIG. 1 represents a seal or joint (EV 180 style): fiberglass cloth impregnated with the water base elastomeric composition of the invention in white color.

The following definitions are provided to allow for a better comprehension of the invention:

The use of the term "approximately" or "about" provides an additional determined range. The term is defined in the following way. The additional range provided by the term is approximately ±10%. By way of example, but not limitative, if it reads "approximately 40 cm", the exact range is between 36 to 44 centimeters.

According to the present invention, the applicant has developed a water-based elastomeric composition for impregnating textiles, eliminating risk situations both for the environment, the factory workers and no less importantly, for the end user of the impregnated textile, especially for textile fibers, such as can be fiberglass.

The water-based elastomeric composition of the invention comprises: an elastomer, a thickener, titanium dioxide, an antioxidant, a fungicide, water and optionally a coloring agent.

In a preferred embodiment, the water-based elastomeric composition further comprises a corrosion inhibitor.

The elastomer is selected, for example, from natural latex, styrene butadiene latex, or mixtures thereof. The styrene butadiene latex may be present from about 0% to about 85% of the total weight percent of the composition, preferably from about 55-80 wt %, from about 40-60 wt %. The natural latex may be present from about 1% to about 80% of the total weight percent of the composition, preferably from about 58-70 wt %, from about 65-75 wt %, from about 7-17 wt %, from about 5.5-13.5 wt %.

The thickener may be selected from kaolin. Said thickener may be present from about 0 wt % to about 17 wt %, preferably from about 4-17 wt %, from about 7-17 wt %, about 8-14 wt %, about 4.5-9.5 wt %, about 8-14 wt %, about 6-12 wt %.

The antioxidant may be selected from, for example, phenols, such as, for instance, styrenated phenols such as those sold under the trademark WINGSTAY L®. The antioxidant may be present from about 0% to about 4%, preferably from about 0.1% to about 4%, from about 1-3 wt %, from about 0.5-2.5 wt %, from about 0.5-2.0 wt %.

The fungicide is selected from aldehyde compounds, such as, for instance, glutaraldehyde. The fungicide may be present from about from about 0 wt % to about 3 wt %, preferably from about 0.1 wt % to about 3 wt %, from about 0.5-2.0 wt %, from about 1.0-2.5 wt %, from about 0.5-2.0 wt %.

The coloring agent is selected, for instance, from blue phthalocyanine and the pantones. The coloring agent may be present from about 0 to about 3 wt %.

The corrosion inhibitor is selected, for example, from sodium benzoate or a water based composition comprising sodium benzoate such as, for example, Zerust Axxanol 8110®. The corrosion inhibitor may be present from about 0 wt % to about 35 wt %, 20 wt % to about 35 wt %, preferably from about 22 wt % to about 30 wt %.

The titanium dioxide may be present from about 0 wt % to about 15 wt %, preferably from about 1 wt % to about 15 wt %, preferably from about 2-6 wt %, about 8-14 wt %, about 2-5 wt %, about 7-11 wt %.

The water may be present from about 1% to about 8% of the total weight percent of the composition, preferably from about 2-5 wt %, from about 3-6 wt %, from about 2-4 wt %, from about 3-6 wt %.

As mentioned in previous lines, the elastomeric composition does not contain aromatics or similar solvents such as, for instance, ketones, alcohols, aromatics, aliphatics, gas solvents, chlorates, glycoethers and mixtures such as Thinner Standard.

The textile material according to the present invention may be selected from fiber glass textile or fiber glass textile with wire inserts, such as, for example, brass wire inserts, stainless steel wire inserts, or a mixture thereof; or wire inserts from a different alloy. Said textile material is impregnated with the water-based elastomeric composition as disclosed.

The resulting textile material thus impregnated has several applications, for instance, may be used to fabricate seals, gaskets, and joints as mentioned in previous lines, which have a resistance to high temperatures and pressures, for instance, temperatures up to about 400° C. and pressures up to about 40 bar.

Further, the ability to identify a new product with a special distinctive color for application to boilers was also developed, for example a light blue, or even available in any other color by means of the addition of pantones, according to the required need.

Additionally, when using seals, gaskets or joints fabricated with the impregnated textile material of the invention, the product end user can operate in high safety without requiring additional protection when repairing or providing maintenance to the equipments working at high temperatures and pressures. Further, the seals, gaskets or joints fabricated with the impregnated textile material of the invention do not leave residues on the surfaces of the equipments, thus facilitating the replacement of the piece.

Figure 2:
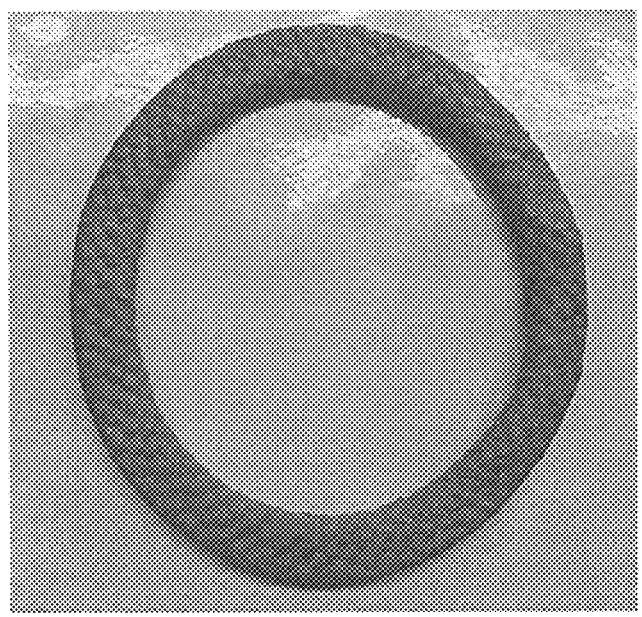
FIG. 2 represents a seal or joint (EV 180 B1 style): fiberglass cloth impregnated with water base elastomeric composition of the invention in light blue color.
Figure 3:
FIG. 3 represents a textile material impregnated with the water-base elastomeric composition (EV 185 style).

To illustrate the fiberglass cloth impregnated with the water base elastomeric mixture, FIGS. 1, 2 and 3 are presented.

The following tables illustrate some preferred water-based elastomeric compositions that could be used to impregnate textile materials, especially fiberglass textiles. The given ranges in the tables are "approximate". The approximate term allows a variation ranging between 0 to 10% of the lower range and of the upper range. As an example, the term from 5 to 7 minutes can mean from 5 to 7 minutes, as well as 4:30 to 7 minutes, 5 to 6:18 minutes, 4:30 to 6:18 minutes, 5:50 to 7:42 minutes, 4:30 to 7:42 minutes, etc.

Composition 1 (EV 180 style)

| COMPONENT | % |
| --- | --- |
| STYRENE BUTADIENE LATEX | 69 |
| NATURAL LATEX | 12 |
| KAOLIN | 9 |
| TITANIUM DIOXIDE | 4 |
| ANTIOXIDANT | 2 |
| FUNGICIDE | 1 |
| WATER | 4 |
| TOTAL: | 100 |

Composition 2 (EV 180 style)

| COMPONENT | % |
| --- | --- |
| STYRENE BUTADIENE LATEX | 67 |
| NATURAL LATEX | 11 |
| KAOLIN | 8.5 |
| TITANIUM DIOXIDE | 4 |
| ANTIOXIDANT | 1.5 |
| FUNGICIDE | 1 |
| WATER | 4 |
| COLOR (BLUE PHTALOCYANINE | 3 |
| TOTAL: | 100 |

Composition 3 (EV 180 style)

| COMPONENT | % |
| --- | --- |
| NATURAL LATEX | 70 |
| KAOLIN | 11 |
| TITANIUM DIOXIDE | 11 |
| ANTIOXIDANT | 1.5 |
| FUNGICIDE | 1.5 |
| WATER | 5.0 |
| TOTAL: | 100.00 |

Composition 4 (EV 180 style)

| COMPONENT | % |
|---|---|
| NATURAL LATEX | 68 |
| KAOLIN | 10.5 |
| TITANIUM DIOXIDE | 10.5 |
| ANTIOXIDANT | 1.5 |
| FUNGICIDE | 1.5 |
| WATER | 5 |
| COLOR (BLUE PHTALOCYANINE) | 3 |
| TOTAL: | 100 |

Composition 5 (EV 185 style)

| COMPONENT | % |
|---|---|
| STYRENE BUTADIENE LATEX | 50 |
| NATURAL LATEX | 8.50 |
| KAOLIN | 6.5 |
| TITANIUM DIOXIDE | 3 |
| ANTIOXIDANT | 1 |
| FUNGICIDE | 1 |
| WATER | 3 |
| CORROSION INHIBITOR | 27 |
| TOTAL: | 100 |

Composition 6 (EV 185 style)

| COMPONENT | % |
|---|---|
| STYRENE BUTADIENE LATEX | 50 |
| NATURAL LATEX | 8 |
| KAOLIN | 6 |
| TITANIUM DIOXIDE | 2.5 |
| ANTIOXIDANT | 1 |
| FUNGICIDE | 1 |
| WATER | 3 |
| CORROSION INHIBITOR | 25.5 |
| COLOR (BLUE PHTALOCYANINE) | 3 |
| TOTAL: | 100 |

Composition 7 (EV 185 style)

| COMPONENT | % |
|---|---|
| NATURAL LATEX | 64 |
| KAOLIN | 9 |
| TITANIUM DIOXIDE | 9 |
| ANTIOXIDANT | 1.5 |
| FUNGICIDE | 1.5 |
| WATER | 5 |
| CORROSION INHIBITOR | 10 |
| TOTAL: | 100 |

Composition 8 (EV 185 style)

| COMPONENT | % |
|---|---|
| NATURAL LATEX | 61 |
| KAOLIN | 9 |
| TITANIUM DIOXIDE | 9 |
| ANTIOXIDANT | 1.5 |
| FUNGICIDE | 1.5 |
| WATER | 5 |
| CORROSION INHIBITOR | 10.0 |
| COLOR (BLUE PHTALOCYANINE) | 3.0 |
| TOTAL: | 100 |

The materials mentioned grant special properties to the composition. For example, the latex provides the refinish over the textile, thus encapsulating the textile's fiber, specially the fiberglass, thus granting in equal form the adhesive property to the textile. The titanium dioxide whitens the mixture. The antioxidant avoids oxidation of the latex. The fungicide protects the fiber of the textile from fungi formed by moisture. The water creates a homogenous dilution. The kaolin acts as a thickener to the mixture. The alternative materials provide color, such as is the case with the blue phthalocyanine and the pantones. It is important to mention these compositions do not require the presence of vulcanizing agents or accelerants.

Methods:

The mixture of the components of the water-based elastomeric composition takes place in a mixture system by means of propellers within a mechanical agitator as those already known in the art comprising a container with fixed stirrers, a cap, drive motor and beating propeller. All the components are mixed for a period varying about between about 5 to about 15 minutes to be followed by the textile impregnation.

The textile impregnation takes place by means of a calendaring process, where the textile is impregnated with the support of rollers through which the amount of the water-based elastomeric composition over the fiberglass can be controlled. After the impregnation, the textile is cured in a drying oven at a temperature varying between about 70° C. and 90° C., this grants the fiberglass the rubbery property, with which it is encapsulated to make it more manageable without the need of using skin protection, further granting in even form the gluing system for the formation of joints which shall be used in equipment such as boilers, ovens, among others. Alternatively, the impregnated textile could be cured at room temperature.

The impregnation of the water-based elastomeric composition having different pigmentations was tested at the applicant's installations by means of a temperature resistance test with water vapor to force the maximum operational conditions of the textile to be tested, which can be reached in any field, in this way covering the possible "curing" ranges, the summarized description of the test is the following:

| Time | Temperature |
|---|---|
| 1 Hour | 50° C. |
| 4 Hours | 75° C. |
| 4 Hours | 150° C. |
| 4 Hours | 300° C. |

So that the textile be approved, it must resist the temperature and the vapor, presenting a certain flexibility, since should the piece appear rigid and not be able to resist said conditions, it will cause breakage to the textile. In the same manner, it must leave the least possible marks within the test device, since that is indicative of minimum elastomeric detachment during the test.

EXAMPLES OF USE

The following examples are illustrative in character and should in no way be interpreted as limitative.

Example 1

Fiberglass Cloth Impregnated with Elastomeric Mixture Water Base and White and Blue Colors
CONSTRUCTION: Woven cloth packaging based on textured fiberglass filaments, impregnated with the water base elastomeric composition of the invention and with a color according to the requested style, thickeners of 0.8 mm, 1 mm up to 3 mm, and widths varying from 1 meter to 1.80 meters and lengths of 50 meters.
APPLICATIONS: The packaging can be used in vapor, solvents, oils, organic chemicals, except for acids with a pH of 4 or lower and highly concentrated alkalis, as insulation in general, to manufacture joints for boilers, packaging for autoclaves, oven doors, etc.
Conditions of Service:
Temperature:
Maximum of EV 180: 350° C. (662° F.)
Maximum of EV 185: 400° C. (752° F.)
Pressure:
    Maximum of EV 180: 20 bar (290 psi)
    Maximum of EV 185: 40 bar (580 psi)
Approximate Kilograms Per Linear Meter:

| 1/16" | 1/8" | 1/4" | 3/8" | 1/2" | 3/4" | 1" |
|---|---|---|---|---|---|---|
| 1.736 | 3.500 | 7.000 | N/A | N/A | N/A | N/A |

Alterations to the disclosed structure in the present specification may be predicted by those skilled in the art. However, it should be understood that the present specification is related with the preferred embodiments of the invention, which is for illustrative purposes only, and should not be construed as a limitation of the invention. All the amendments that do not depart from the spirit of the invention shall be included within the scope of the attached claims.

The invention claimed is:
1. A water-based elastomeric composition for impregnating fiber glass textile materials, free from aromatic solvents, comprising:
    an elastomer consisting of natural latex or styrene butadiene latex, or mixtures thereof;
    kaolin ranging from about 4 wt % to about 17 wt %;
    titanium dioxide ranging from about 1 wt % to about 15 wt %;
    a phenol compound ranging from about 0.1 wt % to about 4 wt %;
    an aldehyde compound ranging from about 0.1 wt % to about 3 wt %;
    water ranging from about 1 wt % to about 8 wt %; and
    sodium benzoate ranging from about 15 wt % to about 35 wt %.
2. The water-based elastomeric composition for impregnating fiber glass textile materials, free from aromatic solvents, according to claim 1, wherein the styrene butadiene latex does not exceed about 85% of the total weight percent of the composition and the natural latex is present from about 1% to about 80% of the total weight percent of the composition.
3. The water-based elastomeric composition for impregnating fiber glass textile materials, free from aromatic solvents, according to claim 1, comprising up to 3 wt % blue phthalocyanine.
4. The water-based elastomeric composition for impregnating fiber glass textile materials, free from aromatic solvents, according to claim 1, wherein the aldehyde compound is glutaraldehyde.
5. The water-based elastomeric composition for impregnating fiber glass textile materials, free from aromatic solvents, according to claim 1, wherein the phenol compound is a styrenated phenol.
6. A process to manufacture an impregnated fiber glass used to create insulting joints and seals which comprises:
    preparing a water base elastomeric mixture as claimed in claim 1;
    impregnating a fiber glass with the water-base elastomeric mixture by means of a calendaring process, where the fiber glass is impregnated with the support of rollers; and
    curing the impregnated fiber glass in a drying oven.
7. The process according to claim 6, wherein the curing temperature varies approximately about between 70° C. and 90° C.
8. A water-based elastomeric composition for impregnating wire inserted fiber glass textile materials, free from aromatic solvents, comprising:
    an elastomer consisting of natural latex or styrene butadiene latex, or mixtures thereof;
    kaolin ranging from about 4 wt % to about 17 wt %;
    titanium dioxide ranging from about 1 wt % to about 15 wt %;
    a phenol compound ranging from about 0.1 wt % to about 4 wt %;
    an aldehyde compound ranging from about 0.1 wt % to about 3 wt %;
    water ranging from about 1 wt % to about 8 wt %; and
    sodium benzoate ranging from about 15 wt % to about 35 wt %.
9. The water-based elastomeric composition for impregnating wire inserted fiber glass textile materials, free from aromatic solvents, according to claim 8, wherein the wire inserts are brass wire inserts, stainless steel wire inserts, or a mixture thereof.
10. The water-based elastomeric composition for impregnating wire inserted fiber glass textile materials, free from aromatic solvents, according to claim 9, wherein the wire inserts are brass wire inserts.
11. The water-based elastomeric composition for impregnating wire inserted fiber glass textile materials, free from aromatic solvents, according to claim 8, wherein the aldehyde compound is glutaraldehyde.
12. The water-based elastomeric composition for impregnating wire inserted fiber glass textile materials, free from aromatic solvents, according to claim 8, wherein the phenol compound is a styrenated phenol.
13. A water-based elastomeric composition for impregnating wire inserted fiber glass textile materials of claim 8, comprising up to 3 wt % of blue phthalocyanine.
14. A wire inserted fiber glass material used for insulating, gasketing, joints or sealing purposes impregnated with a water-based elastomeric composition for impregnating wire inserted fiber glass textile materials, free from aromatic solvents, said composition comprising:

an elastomer consisting of natural latex or styrene butadiene latex, or mixtures thereof;

kaolin ranging from about 4 wt % to about 17 wt %;

titanium dioxide ranging from about 1 wt % to about 15 wt %;

a phenol compound ranging from about 0.1 wt % to about 4 wt %;

an aldehyde compound ranging from about 0.1 wt % to about 3 wt %;

water ranging from about 1 wt % to about 8 wt %; and sodium benzoate ranging from about 15 wt % to about 35 wt %;

wherein said metallic inserts may help to maintain shape memory while folding during manufacturing.

15. The wire inserted fiber glass material used for insulating, gasketing, joints or sealing purposes according to claim 14, wherein the wire inserts are brass wire inserts, stainless steel wire inserts, or a mixture thereof.

16. The wire inserted fiber glass material according to claim 14, resisting temperatures up to about 400° C. and pressures up to about 40 bar.

17. A joint, gasket or insulating seal comprising the wire inserted fiber glass material of claim 14.

* * * * *